(12) United States Patent
Feltenberger

(10) Patent No.: US 9,074,556 B2
(45) Date of Patent: Jul. 7, 2015

(54) INTERNAL COMBUSTION STEAM ENGINE

(71) Applicant: Always on Power, Ltd., Pioneer, OH (US)

(72) Inventor: Bruce D. Feltenberger, Clinton, OH (US)

(73) Assignee: Always on Power, Ltd., Pioneer, OH (US)

( * ) Notice: Subject to any disclaimer, the term of this patent is extended or adjusted under 35 U.S.C. 154(b) by 0 days.

(21) Appl. No.: 14/051,284

(22) Filed: Oct. 10, 2013

(65) Prior Publication Data

US 2014/0096741 A1 Apr. 10, 2014

Related U.S. Application Data

(60) Provisional application No. 61/712,188, filed on Oct. 10, 2012.

(51) Int. Cl.
*F02B 47/02* (2006.01)
*F02M 25/03* (2006.01)

(52) U.S. Cl.
CPC .............. *F02M 25/03* (2013.01); *Y02T 10/121* (2013.01)

(58) Field of Classification Search
CPC .. F02B 47/02; F02B 17/005; F02B 2075/027; F02M 25/022; F01K 21/02; F01K 3/14; F01B 17/04; F01B 29/06; F01B 29/12
USPC ............. 123/25 C, 25 R, 25 P, 25 Q, 21, 41.2
See application file for complete search history.

(56) References Cited

U.S. PATENT DOCUMENTS 4,235,077 A 11/1980 Bryant
4,736,715 A 4/1988 Larsen
(Continued)

FOREIGN PATENT DOCUMENTS

GB 2485929 5/2012
JP 54114640 9/1979
JP 2010-151064 1/2012

OTHER PUBLICATIONS

PCT International Search Report and Written Opinion dated Feb. 27, 2014 for corresponding PCT Application No. PCT/US/13/64401 (9 pages).

*Primary Examiner* — Stephen K Cronin
*Assistant Examiner* — Long T Tran
(74) *Attorney, Agent, or Firm* — Elizabeth Philip Dahm; Kelly J. Kubasta; Ferguson, Braswell & Fraser, P.C.

(57) ABSTRACT

An engine operable using flash steam expansion comprising one or more cylinders each having a piston and one or more water injection ports, the pistons driven by flash steam expansion when injected water rapidly change state from liquid to gas. Another engine operable in an internal combustion mode and a flash steam expansion mode comprising one or more cylinders having a piston, an air intake port and valve, and first and second exhaust ports and valves, first, second, and third cam shafts, wherein the engine is selectably operable in a four-cycle mode or a two-cycle mode. A method of operating an engine in a four-cycle internal combustion mode and a two-cycle flash steam expansion mode comprising the steps of using internal combustion in a four-cycle sequence, detecting when a temperature of the engine reaches a predetermined temperature; and terminating internal combustion and using flash steam expansion in a two-cycle sequence.

25 Claims, 14 Drawing Sheets

(56) References Cited

U.S. PATENT DOCUMENTS

| | | | |
|---|---|---|---|
| 4,805,571 A | 2/1989 | Humphrey | |
| 4,841,928 A * | 6/1989 | Paul et al. | 123/193.4 |
| 5,010,852 A * | 4/1991 | Milisavljevic | 123/21 |
| 5,035,115 A | 7/1991 | Ptasinski | |
| 5,239,885 A | 8/1993 | Voigt | |
| 6,705,300 B2 * | 3/2004 | Allmendinger et al. | 123/568.14 |
| 6,725,662 B2 | 4/2004 | Baba et al. | |
| 7,267,088 B2 * | 9/2007 | Ezaki et al. | 123/90.11 |
| 7,438,027 B1 | 10/2008 | Hinderks | |
| 8,468,815 B2 * | 6/2013 | McBride et al. | 60/413 |
| 2004/0003781 A1 * | 1/2004 | Yuki et al. | 123/25 C |
| 2004/0083729 A1 | 5/2004 | Teacherson | |
| 2008/0034755 A1 * | 2/2008 | Tour et al. | 60/620 |
| 2008/0223332 A1 * | 9/2008 | Maro et al. | 123/25 R |
| 2010/0043743 A1 * | 2/2010 | Maxwell | 123/25 C |
| 2010/0146949 A1 | 6/2010 | Stobart et al. | |
| 2011/0107762 A1 | 5/2011 | Yamamoto et al. | |
| 2011/0146629 A1 | 6/2011 | Radocaj | |
| 2012/0060493 A1 | 3/2012 | Matthews et al. | |
| 2012/0067325 A1 | 3/2012 | Wathieu et al. | |
| 2012/0152184 A1 * | 6/2012 | Lueck | 123/3 |
| 2012/0240897 A1 * | 9/2012 | Walpita | 123/294 |
| 2013/0139507 A1 * | 6/2013 | Morse | 60/624 |

\* cited by examiner

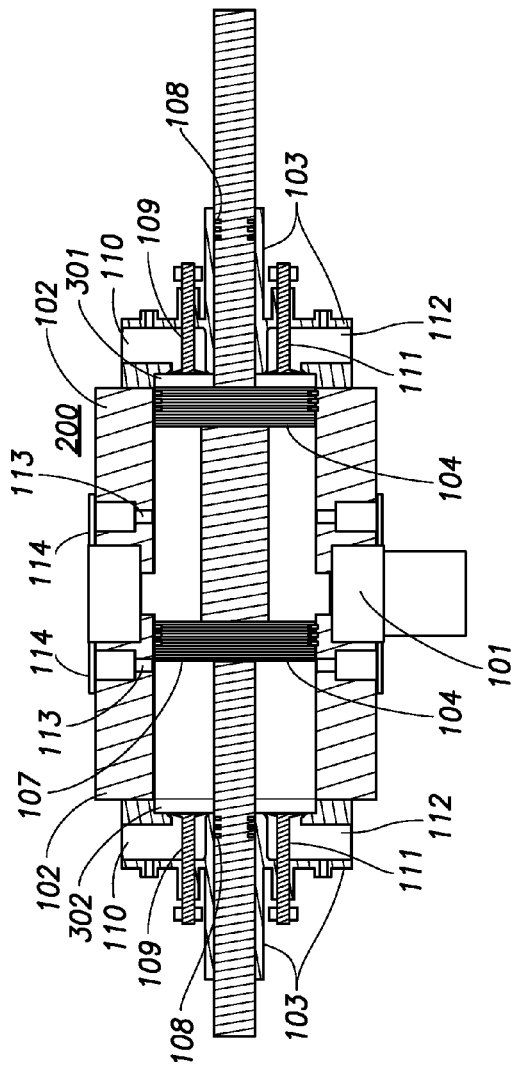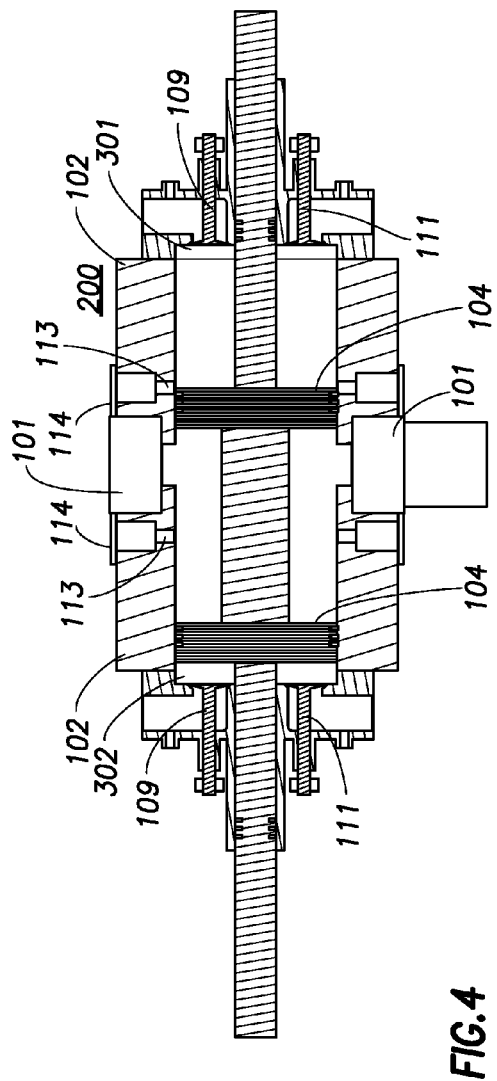
FIG.3
FIG.4

INTERNAL COMBUSTION STEAM ENGINE

CROSS-REFERENCE TO RELATED APPLICATION

This application claims priority to U.S. Provisional Patent Application No. 61/712,188, entitled INTERNAL COMBUSTION STEAM ENGINE, filed Oct. 10, 2012, which is hereby incorporated by reference for all purposes.

FIELD OF THE DISCLOSURE

The present disclosure relates to power generation and more specifically relates to an engine that combines the features of an internal combustion engine with the features of a steam engine.

BACKGROUND OF THE DISCLOSURE

Electricity that is used on a regular basis—day-to-day, and month-to-month by homeowners, businesses and factories—is typically provided by utility companies and delivered through a grid system. From experience, these utility companies determine how much electricity they need to provide at various times of the day and night in order to supply the needs of each area or zone of customers without experiencing outages. This can be referred to as providing base load or primary power.

From time to time the amount of electric power that is required/demanded changes based on unusual conditions. As an example, during periods of hot summer weather air conditioners run frequently. This can result in power being required over and above the base load. This extra power can be referred to as peaking power or secondary power and can be supplied by the utility company using temporary generating means such as engine/generator sets, which are well suited for quick response back up power.

About 70% of the world's base load electricity power generation (primary power) is produced by steam turbines that are powered by burning coal or by nuclear energy. Steam turbines have relatively few moving parts and fairly long life cycles. However, typical coal fired power plants operate at only 30 to 35% efficiency when comparing the energy value of the coal to the kilowatt hours generated and nuclear power plants have a wide range of hazards and complexities associated with them. Various types of engines have therefore been used to drive generators in an effort to provide options to coal and nuclear power generation. Engines, however, have many moving components and typically run at high speeds of several thousand RPMs. If used continuously for extended periods as would be required to provide base load power, engines tend to wear out quickly, have comparatively short life cycles and are expensive to maintain and replace. Thus, while engine/generator sets work well in providing emergency backup power in residential and commercial applications, they are generally not economical for providing base load power in place of grid power because of the high cost of operation, maintenance and or/replacement.

Just as coal fired power generation is highly inefficient, internal combustion engines are also highly inefficient. It is well known that about one-third of the fuel energy powering internal combustion engines goes out the exhaust pipe as lost heat and another one-third or so is lost to the cooling system. A good well designed four cycle engine achieves only about 28% thermal efficiency.

During the last 120 years or so, there have been many efforts expended to introduce water and/or steam into the workings of the internal combustion engine for the purpose of trying to improve engine performance.

For example, some engines have utilized water injections into the air/fuel intake or directly into the combustion chambers in order to cool the combustion chambers and prevent pre-detonation. Octane ratings of the fuel can be effectively increased in this manner and depending on various criteria; engine power and/or efficiency may be improved.

Other engines have been modified to accept injections of hot water directly into the combustion chamber. This can occur along with the air/fuel mixture on the power stroke or in place of some or all of the fuel that would normally be used. When the water flashes into steam, it produces an explosive effect to push the pistons. The power produced by the steam depends on several factors such as the amount of water and fuel being used, the temperature of the engine and the water, the pressure of the water and the timing of the injections. Properly done, this is a process that could improve engine performance.

Still other engines utilize some of the waste heat produced by the internal combustion process to produce steam, which is then injected into the combustion chamber to increase pressure or it is applied directly to the crankshaft area to increase torque.

Many combinations of heat, pressure, water and steam have been tried over the years in conjunction with internal combustion engines, but none has emerged with the characteristics that are necessary to produce a commercially viable internal combustion steam engine that can be used for powering generators for base load electricity requirements.

Consequently, a need has been felt to provide such an engine, which exhibits a high efficiency, long life cycle, ease of maintenance, low emissions and low to moderate engine cost. A need has also been felt to provide such an engine in different sizes, so as to serve the needs of individual homes, small, medium and large businesses as well as power plants.

SUMMARY

Embodiments of the present disclosure generally provide an internal combustion steam engine and methods for operating an internal combustion steam engine using internal combustion, flash steam expansion, or a combination thereof, as well as operating an engine in four-cycle and two-cycle modes.

The present disclosure is directed in one aspect to an engine operable using flash steam expansion, comprising one or more cylinders, each cylinder comprising a piston and one or more water injection ports, the one or more water injection ports configured to receive water; wherein the one or more pistons may be driven in response to flash steam expansion occurring within the one or more cylinders when water injected therein rapidly change state from liquid to gas.

In various embodiments, the engine may comprise a single piston rod extending through and beyond each cylinder and to which each piston may be rigidly coupled. In various embodiments, the one or more cylinders may comprise one or more exhaust ports. In an embodiment, the engine may comprise one or more exhaust manifolds coupled with the one or more exhaust ports.

In various embodiments, the one or more cylinders may comprise an air intake port and a fuel ignition mechanism. In various embodiments, the piston in a given cylinder may be partially driven through a power stroke by internal combustion and further driven through the remainder of the power stroke by flash steam expansion. In various embodiments, the engine may be configured to ignite a mixture of fuel and air within the one or more cylinders and, subsequently within the same power stroke, inject water through the water injection ports into the one or more cylinders. In an embodiment, the injected water may be heated to a superheated state prior to injection.

In various embodiments, a system comprising the engine may comprise a crankshaft coupled to a first end of the piston rod. In an embodiment, the crankshaft may be rotatably driven by a motor. In an embodiment, a system comprising the engine may comprise a momentum device coupled with the piston rod.

In various embodiments, a system comprising the engine may comprise a power takeoff device coupled to a second end of the piston rod. In an embodiment, the power takeoff device may comprise a double over running clutch gearbox. In another embodiment, the power takeoff device may comprise a linear generator. In yet another embodiment, the power takeoff device may comprise a reciprocating hydraulic pump.

In an embodiment, a system comprising the engine may comprise a water source in fluid connection with the one or more water injection ports and in thermal connection with the one or more exhaust manifolds so as to transfer heat from the one or more exhaust manifolds to the water source. In another embodiment, a system comprising the engine may comprise an independent heat source configured to heat water prior to injection into the one or more cylinders.

In another aspect, the present disclosure is directed to an engine operable in an internal combustion mode and a flash steam expansion mode, comprising one or more cylinders, each cylinder comprising a piston, an air intake port having an intake valve, and first and second exhaust ports having first and second exhaust valves, respectively; a first cam shaft for operating the first exhaust valve on each cylinder; a second cam shaft for operating the second exhaust valves on each cylinder; and a third cam shaft for operating the intake valve on each cylinder; wherein the engine may be selectably operable in a four-cycle mode or a two-cycle mode.

In an embodiment, the one or more cylinders may be arranged in a linear configuration, and may further comprise a single piston rod extending through and beyond each cylinder and to which each piston is rigidly coupled.

In an embodiment, the engine may be operable using internal combustion or a combination of internal combustion and flash steam expansion in the four-cycle mode. In another embodiment, the engine may be operable using flash steam expansion in the two-cycle mode. In yet another embodiment, in the four-cycle mode, for a given cylinder, the second exhaust valve may be configured to close by disabling the second cam shaft, the third cam shaft may be configured to open and close the intake valve once every four strokes of the engine, and the first cam shaft may be configured to open and close the first exhaust valve once every four strokes of the engine, the opening and closing of the first exhaust valve occurring 270 degrees out of phase with the opening and closing of the intake valve. In still another embodiment, in the two-cycle mode, for a given cylinder, the intake valve may be configured to close by disabling the third cam shaft, the first cam shaft may be configured to open and close the first exhaust valve once every four strokes of the engine, and the second cam shaft may be configured to open and close the second exhaust valve once every four strokes of the engine, the opening and closing of the second exhaust valve configured to occur 180 degrees out of phase with the opening and closing of the first exhaust valve.

In yet another aspect, the present disclosure is directed to a method of operating an engine operable in a four-cycle internal combustion mode and a two-cycle flash steam expansion mode, the method comprising the steps of using internal combustion to drive one or more pistons in a given cylinder in a four-cycle sequence; detecting when a temperature of the engine reaches a predetermined temperature; and terminating internal combustion and using flash steam expansion to drive the one or more pistons in a given cylinder in a two-cycle sequence.

In an embodiment, the step of using internal combustion to drive one or more pistons in a four-cycle sequence may comprise the sub-steps of opening and closing an intake port of the given cylinder at a first interval; and opening and closing an exhaust port of the given cylinder at a second interval; wherein the second interval is 270 degrees out of phase with the first interval.

In another embodiment, the step of terminating internal combustion and using flash steam expansion to drive the one or more pistons in a two-cycle sequence may comprise the sub-steps of ceasing the intake of air into the given cylinder; opening and closing a first set of exhaust ports of the given cylinder at a first interval; and opening and closing a second set of exhaust ports of the given cylinder at a second interval; wherein the second interval is 180 degrees out of phase with the first interval.

In yet another embodiment, the method may comprise the further step of using a combination of internal combustion and flash steam expansion to drive the one or more pistons in a given cylinder in the four-cycle sequence.

In still another embodiment, the further step of using a combination of internal combustion and flash steam to drive the one or more pistons in a given cylinder in the four-cycle sequence may comprise the sub-steps of supplying a suitable stoichiometric ratio of fuel and air into a given cylinder during an intake stroke of the four-cycle sequence; igniting the fuel-air mixture during a power stroke of the four-cycle sequence, the resulting combustion partially driving the piston way through the power stroke; and when the piston is partially through the power stroke, supplying water into the given cylinder.

Other technical features may be readily apparent to one skilled in the art from the following figures, descriptions and claims.

BRIEF DESCRIPTION OF THE DRAWINGS

For a more complete understanding of the features, example embodiments and possible advantages of the present disclosure, reference is now made to the detailed description of the disclosure along with the accompanying figures and in which:

FIG. 3 and FIG. 4 are close up side sectional views of one engine compartment depicted in FIG. 1;

DETAILED DESCRIPTION OF THE DISCLOSURE

Figure 1:
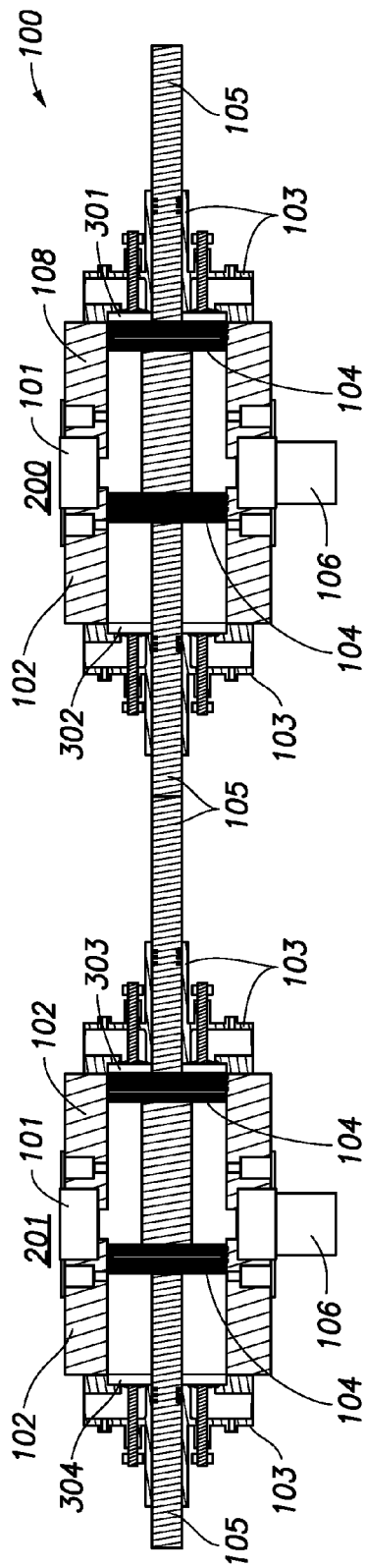
FIG. 1 and FIG. 2 are side sectional views of the primary components comprising a four cylinder linear engine according to one embodiment of the present disclosure.
Figure 2:
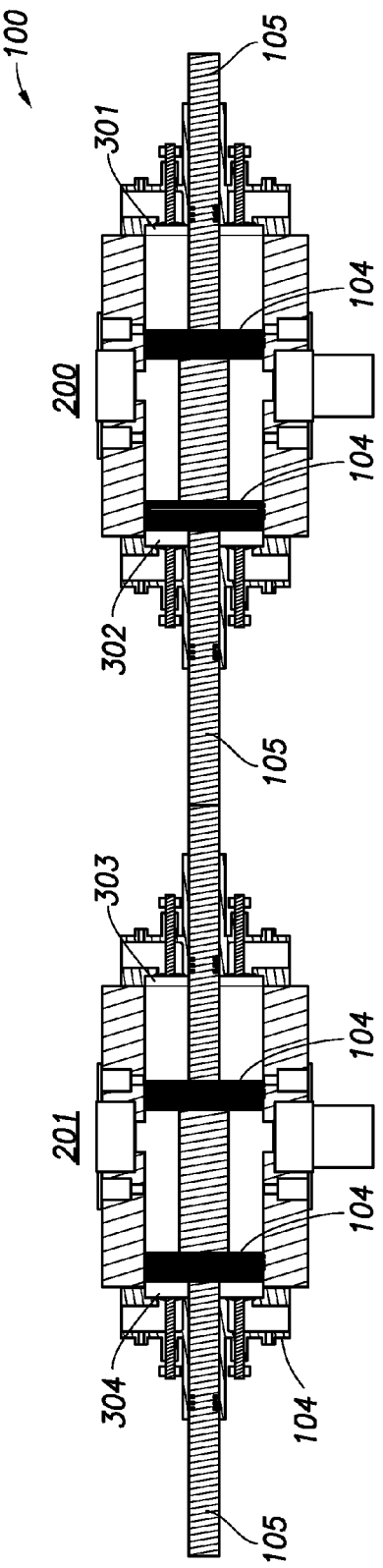

Referring now to the drawings wherein the showings are for purposes of illustrating embodiments of the present disclosure only and not for purposes of limiting the same, and wherein like reference numerals are understood to refer to like components, FIG. 1 and FIG. 2 show sectional side views of the primary components of a four cylinder, four cycle linear engine 100 according to one embodiment. It should be understood, however, that embodiments of the present disclosure will work with any type and size of engine chosen with the sound judgment of a person of skill in the art. The engine 100 may include two identical engine compartments 200 and 201 respectively. Each engine compartment 200 and 201 may include one oil case 101, two cylinders 102 and two cylinder heads 103. The cylinders 102 may be secured to the oil cases 101 by a plurality of bolts and the cylinder heads 103 may be secured to the cylinders 102 by a plurality of bolts in a known manner. Each engine compartment 200 and 201 may also include two identical pistons 104 that may be rigidly fastened to a common piston rod 105. The piston rod 105 may extend entirely through and beyond both engine compartments 200 and 201.

As the engine 100 operates, the pistons 104 push the piston rod 105 in a direction parallel to its longitudinal centerline. FIG. 1 shows the piston rod 105 and pistons 104 at the end of their stroke length in one direction (to the right in this FIGURE) and FIG. 2 shows the piston rod 105 and pistons 104 at the end of their stroke length in the opposite direction (to the left in this FIGURE). Typical with four cycle engines, each piston goes into a power stroke, or is "fired" once every four strokes of the piston rod. With reference to FIG. 1, when the air/fuel mixture is ignited in combustion chamber 301, the explosive force of combustion pushes the piston 104 to the left into the position shown in FIG. 2, moving all four pistons 104 and the piston rod 105 at the same time. At the end of that stroke, combustion chamber 304 ignites and pushes all the pistons and piston rod back to the right to their original position shown in FIG. 1. At that time, combustion chamber 303 ignites, driving the pistons and piston rod to the left again as shown in FIG. 2. Next, combustion chamber 302 ignites, driving the pistons and piston rod to the right as in FIG. 1. The sequence repeats continually as the engine runs.

For the linear engine 100 just described, each piston 104 goes through a four stroke sequence that includes: (1) a power stroke (that is, a combustion or fired stroke); (2) an exhaust stroke; (3) an intake stroke; and, (4) a compression stroke. In the intake stroke, an intake valve may open to allow air into the cylinder, and remain closed through the other strokes. In the exhaust stroke, an exhaust valve may open to allow gases (products of combustion, or steam, for example) to exhaust from the cylinder, and remain closed through the other strokes. This results in both the intake valve and the exhaust valve being closed during the compression and power strokes. Opening and closing of valves may be effected by any suitable mechanism, such as cam shafts. Because of the orientation of the pistons 104 and cylinders 102, the four pistons 104 alternate in their stroke. Thus, when one piston 104 is in the power stroke, a second will be in the exhaust stroke, a third will be in the intake stroke and a fourth will be in the compression stroke. This means that one power stroke occurs on every stroke of the pistons and the piston rod. In a four-cylinder linear embodiment, for example, piston rod 105 may be driven back and forth in using any suitable alternating sequence of power strokes amongst the cylinders. For example, assuming the cylinders are arranged from left to right as 1, 2, 3 and 4, the piston of cylinder 1 may drive piston rod 105 to the left, then the piston of cylinder 2 may drive piston rod 105 to the right, then the piston of cylinder 3 may drive piston rod 105 to the left, and the piston of cylinder 4 may drive piston rod 105 to the right, then repeat (i.e., a 1-2-3-4 sequence). As another example, the pistons may drive piston rod 105 back and forth in a 1-4-3-2 sequence. Any suitable sequence producing this back and forth motion of piston rod 105 is envisioned, and the present disclosure should not be limited to the illustrative embodiments set forth herein.

FIG. 3 and FIG. 4 show a plurality of piston rings 107, which may be fitted to pistons 104 to provide a seal with the bores of the cylinders 102. A plurality of piston rings 108 may be fitted to the piston rod 105 to provide a seal between the piston rod 105 and the inside diameter of the cylinder heads 103. Intake valves 109 may be provided in the cylinder heads 103 in communication with intake ports 110. Exhaust valves 111 may be provided in the cylinder heads 103 in communication with exhaust ports 112. A plurality of vent holes 113 may be provided in the cylinders 102. Depending on the preference of the designer, the vent holes 113 may occur every one inch or so spanning about ½ to ⅔ of the top portion of the circumference of the cylinders 102. When steam is used to push the pistons 104, a relatively high pressure is expected to be maintained inside the cylinders 102, unlike the decreasing pressure produced by combustion of the fuel. It is anticipated that the pressure would be too high to open the exhaust valves without the pressure relief provided by the vent holes 113 when the piston 104 is completing its full stroke length in the direction moving away from the cylinder head 103.

FIG. 4 shows the piston 104 on the right side at the end of its power stroke in relation to combustion chamber 301. The corresponding vent hole 113 is exposed to the high pressure side of the piston 104 and due to a plurality of vent holes also being exposed, the pressure instantly drops to near zero. Most of the pressurized gasses and/or steam exit the cylinder through vent holes 113 and are conveyed into the exhaust manifold via an exhaust port connected to the cover plates 114, which may be rigidly secured entirely around cylinders 102. On the return stroke, as the piston moves toward combustion chamber 301, the exhaust valve 111 is able to open and further exhaust the remaining gasses and/or steam. In one embodiment, all four pistons and cylinders operate in this manner.

Figure 5:
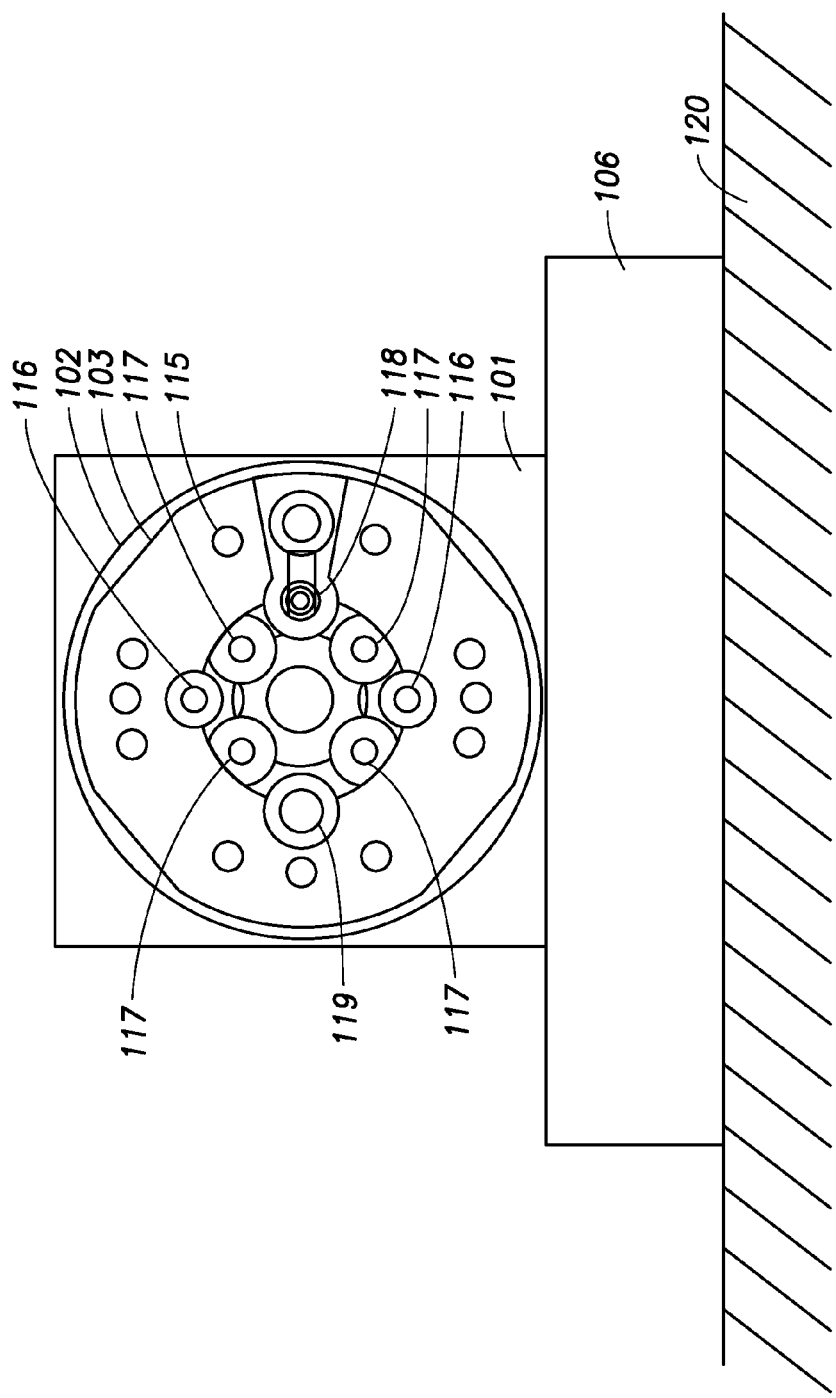
FIG. 5 is an end view of one engine compartment depicted in FIGS. 3 and 4.

FIG. 5 shows an end view of one of the engine compartments and is representative of all four engine compartment ends. A plurality of bolt holes 115 may be used to secure the cylinder head 103 to the cylinder 102. Two tapped holes 116 may be provided to install two spark plugs, one spark plug per hole, in each cylinder head 103. Using two spark plugs per cylinder head helps assure uniform combustion around the piston rod. Four holes 117 may be provided in each cylinder head 103 for the intake and exhaust valves. A prototype engine, described below, uses one intake and one exhaust valve per cylinder head. However, when the two cycle steam mode is added, a third valve may be activated. One or more water injection ports 118 may be provided in each cylinder head 103 along with one or more water injectors (which can the same as or similar to fuel injectors used in many engines), and a tapped hole 119 may be provided for use as an inspection port. When not being used for inspection, a bolt and seal may be used to seal this port. The oil case 101 may be secured by a plurality of bolts to the engine support block 106. The engine support block 106 for each engine compartment may be rigidly secured to a support frame 120. The support frame 120 may be of any design chosen with the sound judgment of a person of skill in the art.

Figure 6:
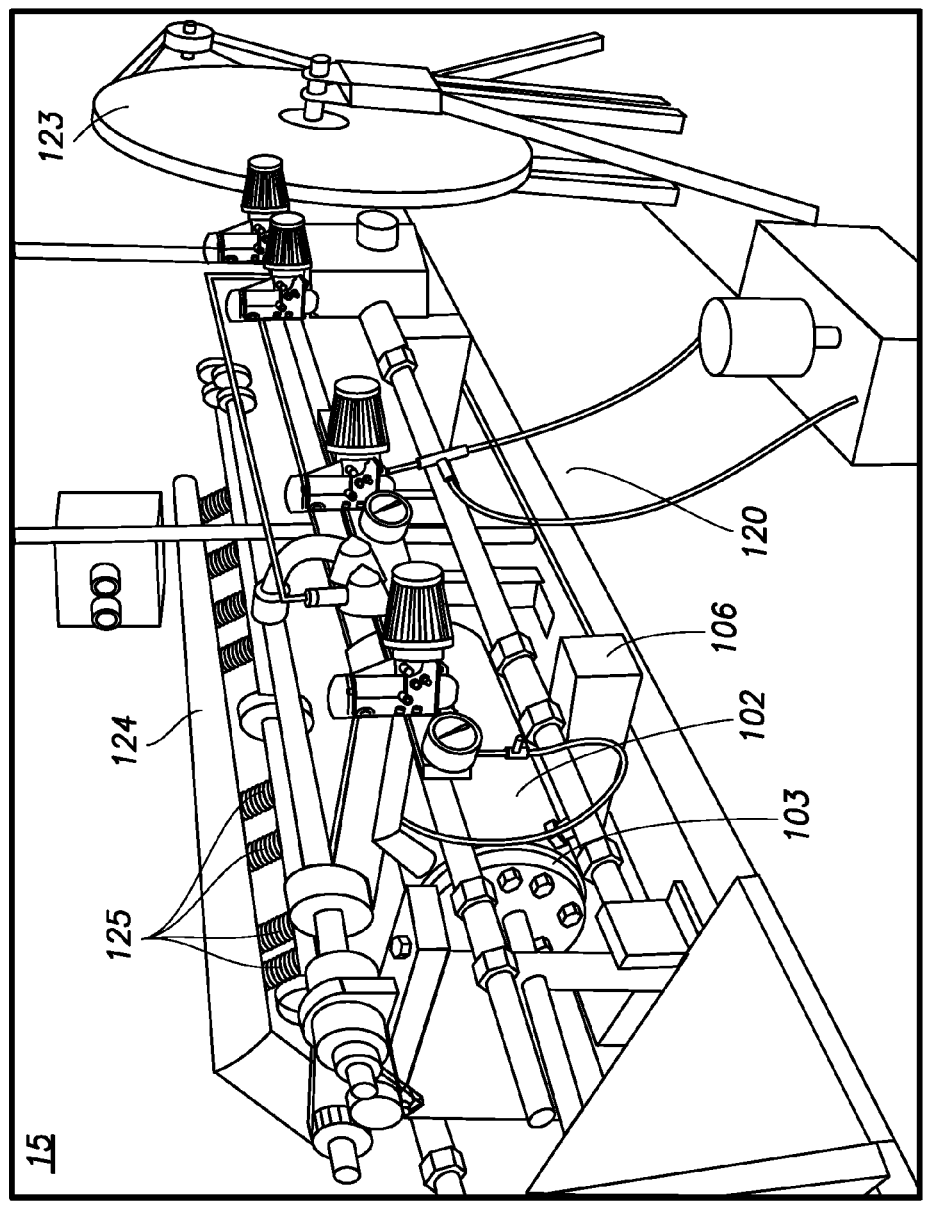
FIG. 6 is a perspective view from the output end of the flywheel side of a prototype linear four cylinder engine that uses components shown in FIGS. 1 and 2.

FIG. 6 shows a prototype linear four cylinder engine built by this inventor that uses components shown in FIGS. 1 and 2. While the prototype is of a certain size, one having ordinary skill in the art will appreciate the engine may be scaled up or down in size for any suitable application. Cylinder 102, cylinder head 103, engine support block 106, and support frame 120 are all visible and referenced. A momentum device, such as a relatively large flywheel/pulley 123, may be used for a variety of purposes. In an embodiment, a momentum device may be used to provide momentum to the piston rod 105, thereby ensuring the pistons 104 carry through the entire stroke. For example, in an embodiment comprising vent holes 113, depending on their location in a cylinder 102, exhaust gases (products of combustion and/or steam) may be vented and cause a reduction in pressure that could, in some cases, result in the piston 104 not completing a given stroke. A momentum device may provide the energy to carry the piston 104 through the remainder of the stroke. Similarly, a momentum wheel may help run the engine for a period of time after shutdown, thereby providing extra output by drawing upon the energy stored in the momentum device. In another embodiment, a momentum device may facilitate startup of the engine. In yet another embodiment, a momentum device may serve to smooth the engine strokes. Exhaust tubes 125 may communicate the engine with the exhaust manifold 124.

Figure 7:
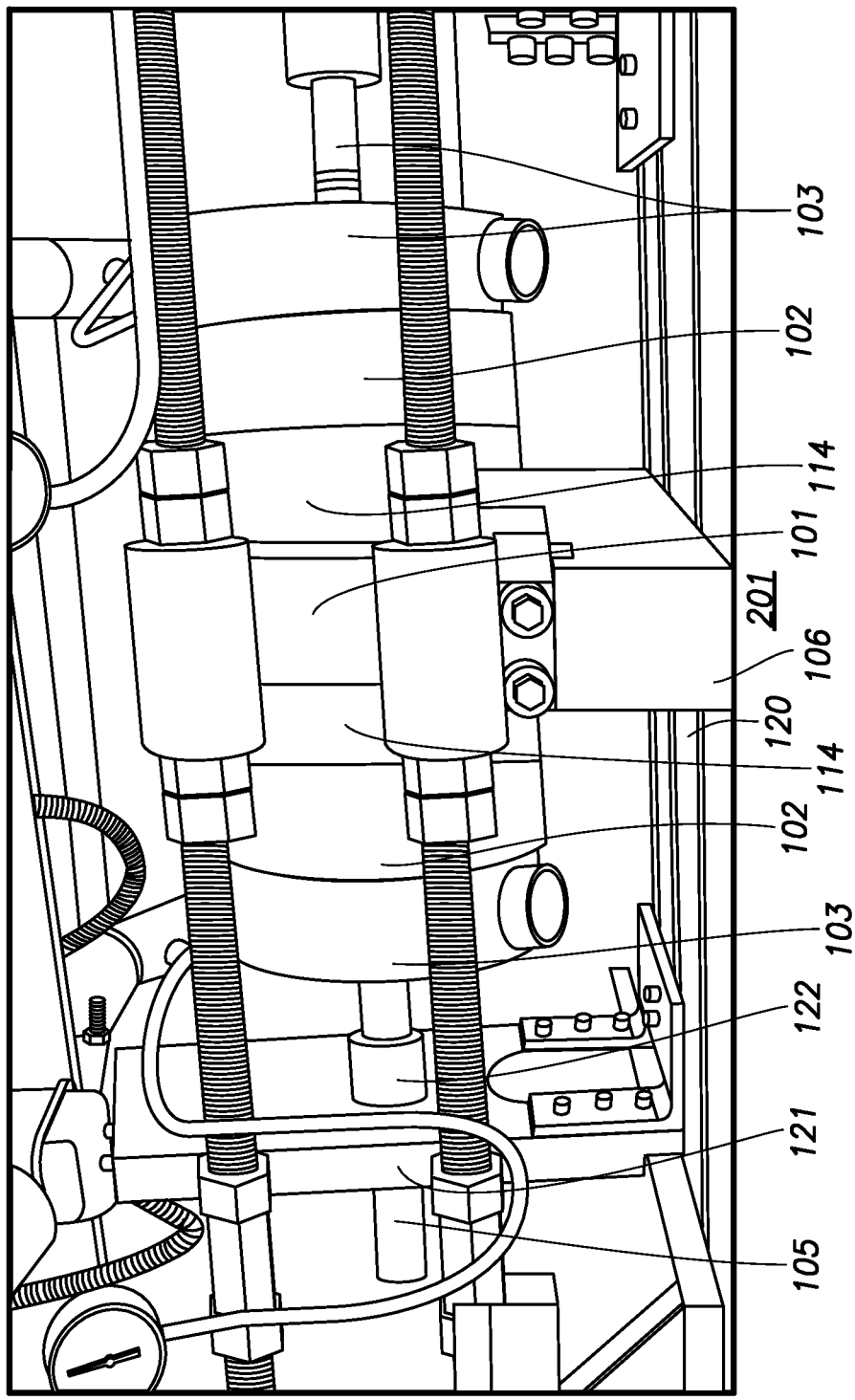
FIG. 7 is a close up view of a portion of the flywheel side of the engine shown in FIG. 6.

FIG. 7 shows two cylinders 102, two cylinder heads 103 and two cover plates 114. One oil case 101, one engine support block 106, one engine support frame 120 and a piston rod 105 are visible. A bronze bushing 122 that provides support outside of the engine for the piston rod 105 may be securely fastened to a vertical outboard support plate 121. The vertical outboard support plate 121 may be rigidly secured to the support frame 120. The longitudinal centerline of the bronze bushing 122 may be on the same longitudinal centerline as the piston rod 105 and the piston rod 105 may slide in a reciprocating manner through the inside of the bronze bushing 122.

Figure 8:
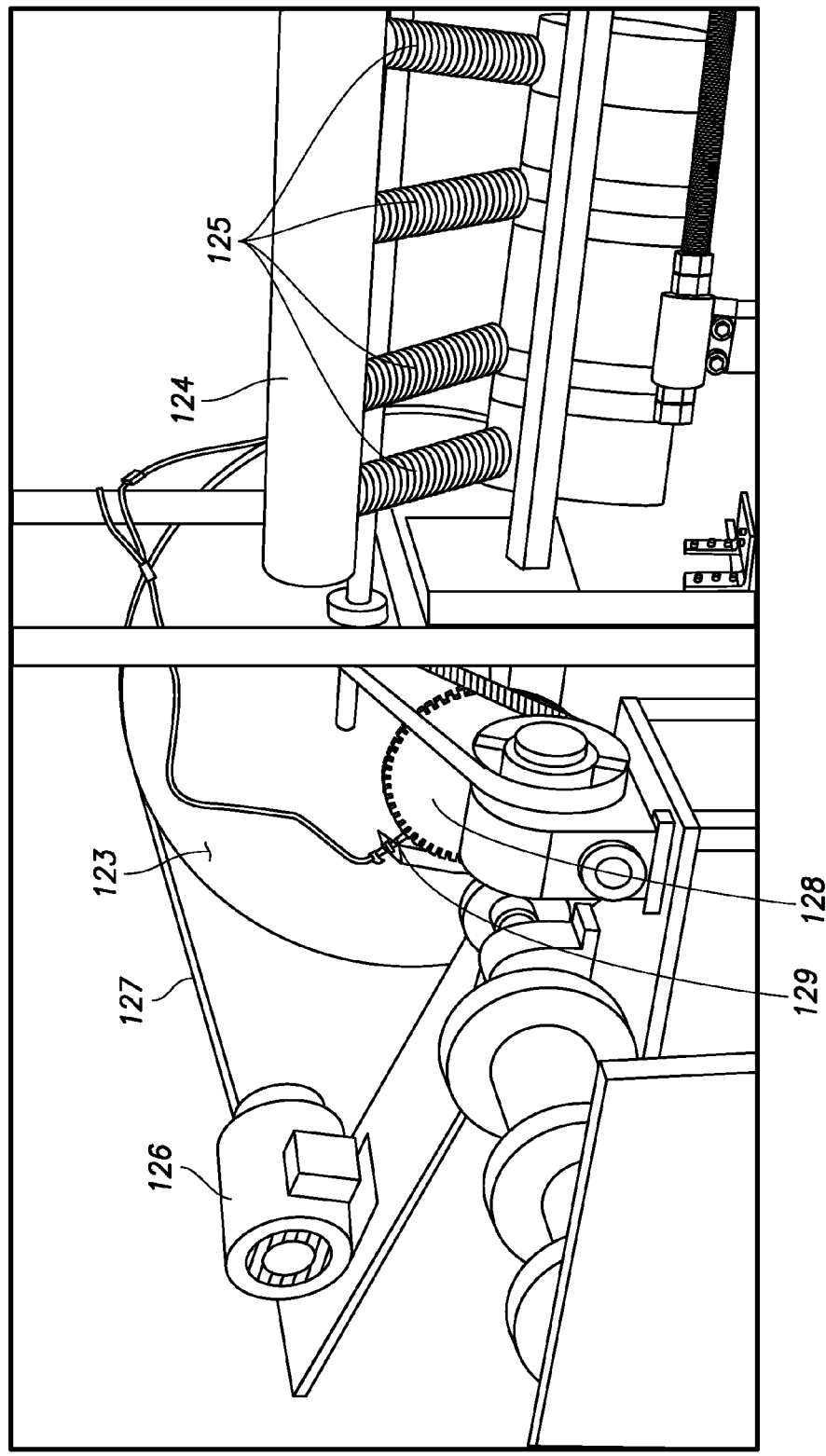
FIG. 8 is a close up view from the exhaust side of the input end of the engine shown in FIG. 6.

Referring to FIG. 8, a starter motor 126 may be used to start engine 100. Motor 126 may be operated using manual controls, or alternatively may be operated via computer control. In an embodiment, starter motor 126 may comprise a pulley wheel connected to a pulley belt 127 which in turn may be connected to a flywheel/pulley 123. In an embodiment, the starter motor pulley wheel and the pulley flywheel/pulley 123 may be sized so that the flywheel/pulley 123 spins at approximately 230 rpm while starter motor 126 is running. A timing disk 128, which may spin at the same speed as the flywheel/pulley 123, may be used along with one or more magnetic sensors 129 to provide data for the timing of fuel injections and for measuring engine speed. Exhaust manifold 124 and four exhaust tubes 125 are also shown.

In some embodiments, engine 100 may be started using starter motor 126 only—that is, without operating engine 100 itself using fuel combustion or flash steam expansion. Once a desired startup speed is achieved (in an embodiment, 230 rpm), internal combustion operation may be initiated. In an embodiment, a one-way overrunning clutch connecting starter motor 126 to the motor pulley wheel may automatically slip or spin free when engine speed exceeds motor speed, thus enabling starter motor 126 to spin without placing a load on engine 100 while engine 100 is running.

Figure 9:
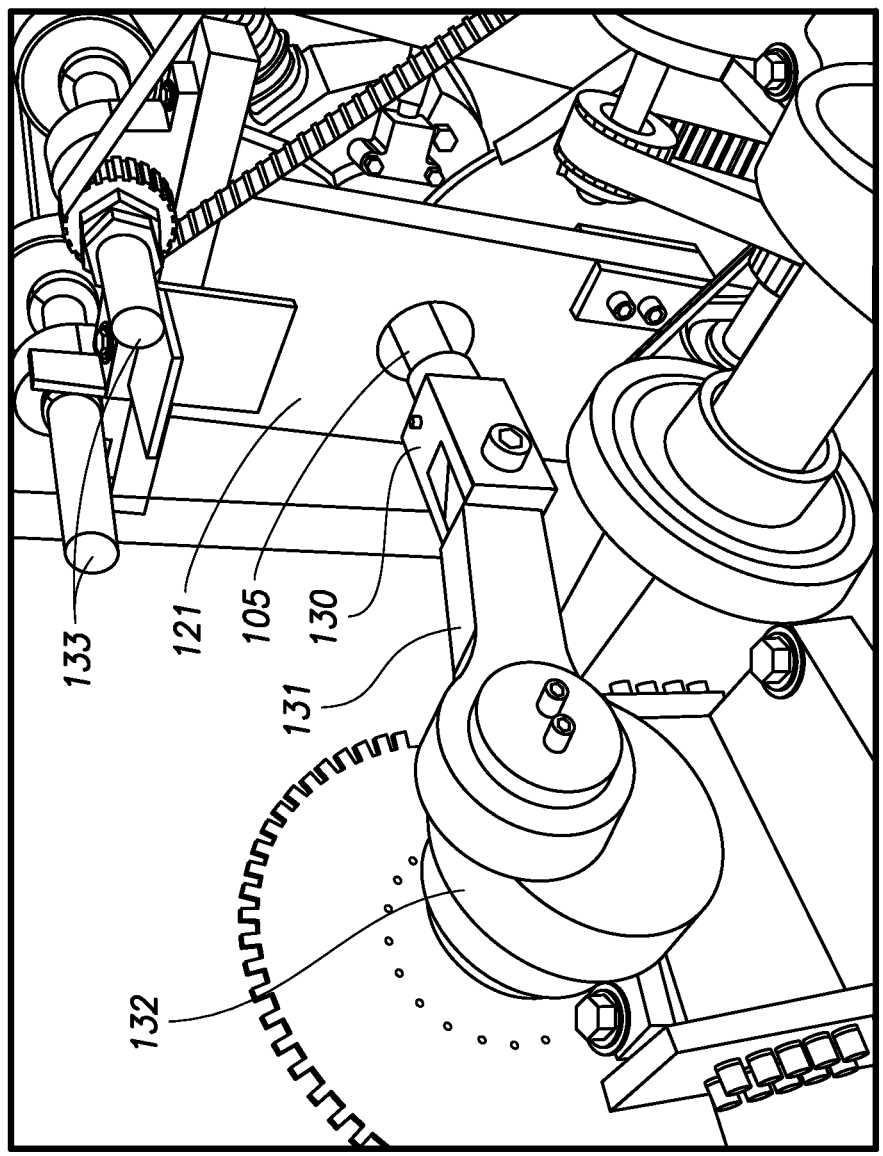
FIG. 9 is a close up view of the input end of the engine shown in FIG. 6.

FIG. 9 shows the input end of the piston rod 105, which extends through a vertical outboard support plate 121. The piston rod 105 may be rigidly connected to a first end of a clevis 130. A first end of conrod 131 may be rotatably connected to the second end of clevis 130 and the second end of the conrod 131 may be rotatably connected in an offset manner to a hub 132. The ends of two parallel cam shafts 133 are also shown.

Figure 10:
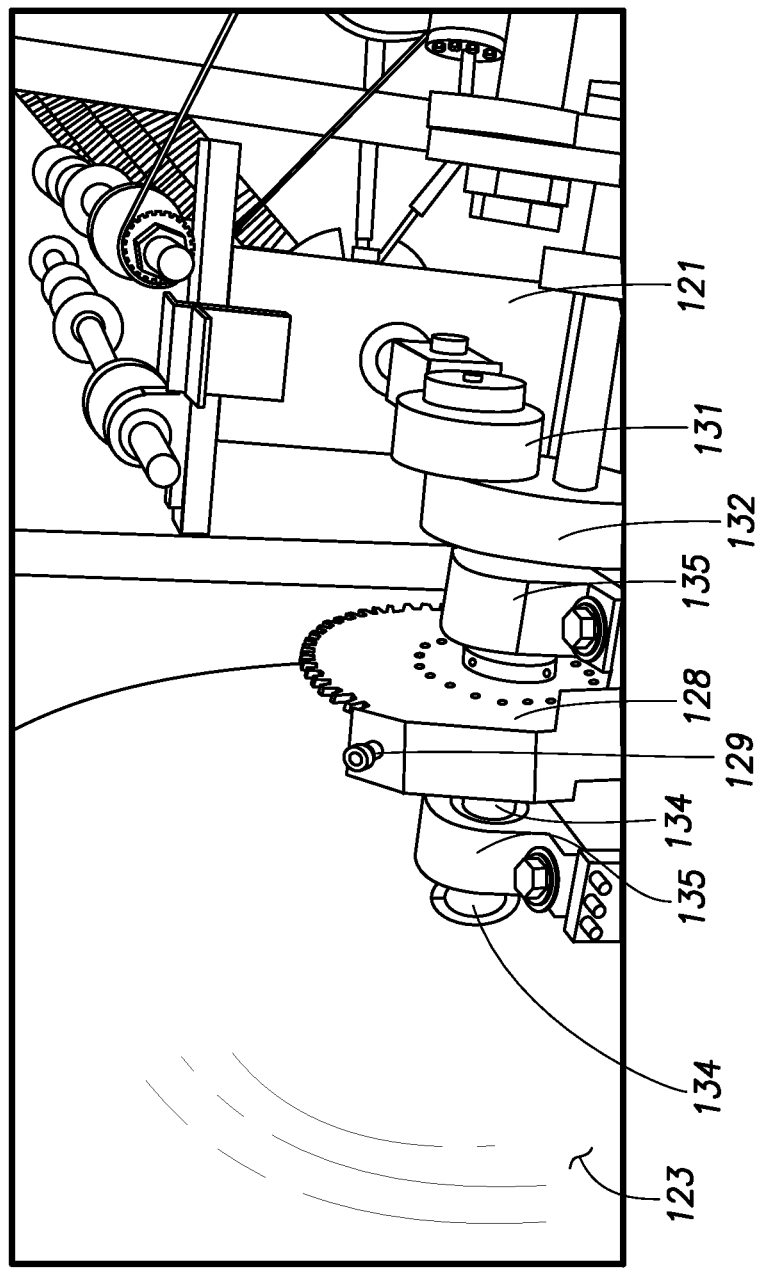
FIG. 10 is also a close up view of the input end of the engine shown in FIG. 6 but from a different angle.

FIG. 10 shows the vertical outboard support plate 121 and the second end of conrod 131. The hub 132 forms the first end of the flywheel/pulley axle 134. Two bearings 135 may support the flywheel/pulley axle 134 in a rotatable manner. Also shown are the timing disk 128, a magnetic sensor 129 and the flywheel/pulley 123, which is securely mounted to the second end of the axle 134. While the linear engine 100 herein depicted does not employ a crankshaft on the output end of the engine for power off take, the arrangement shown in FIGS. 9 and 10 forms a crankshaft on the input end of the engine. The offset distance from the center of hub 132 to the centerline of the conrod 131 connection establishes the length of stroke travel of the piston rod 105. As the flywheel/pulley turns one full revolution, the piston rod 105 moves one full stroke toward the output end of the engine 100 and returns one full stroke toward the input end of the engine 100. Therefore, every full turn of the flywheel/pulley 123 results in two full strokes of the piston rod 105, and two revolutions of the flywheel/pulley 123 results in one complete four stroke cycle.

Timing belts may be used to establish the rotary relationship between cam shafts 133 and flyweel/pulley 123—that is, timing belts may enable the correct relationship between the linear position of pistons 104 and the opening/closing of intake valves 109 and exhaust valves 111. In an embodiment, for every two turns of flywheel/pulley 123, cam shafts 133 rotate once.

Figure 11:
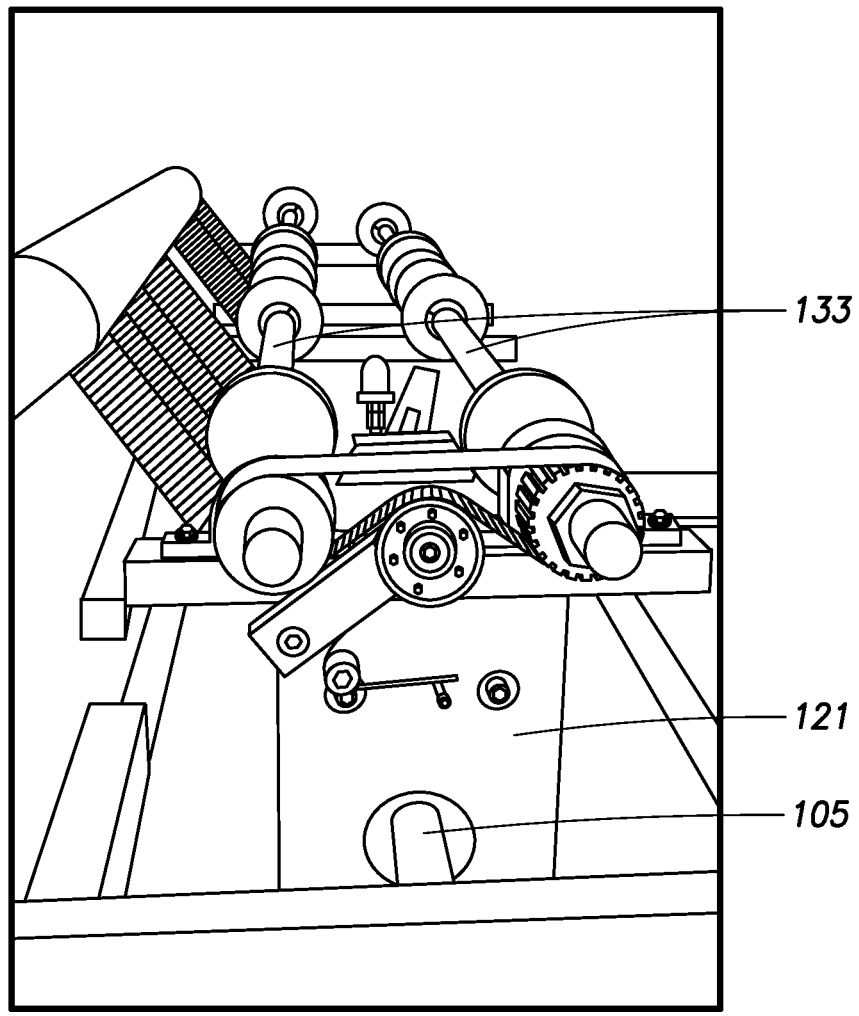
FIG. 11 is a perspective view of the output end of the engine shown in FIG. 6.

FIG. 11 is an output end view of the engine, showing the full length of the engine. Vertical outboard support plate 121 and piston rod 105 are shown. Two parallel cam shafts 133 are also shown and eight exhaust tubes are visible. A timing belt as shown in FIG. 11 may drive the cam shaft 133 responsible for controlling exhaust valves 111 and another timing belt may connect cam shafts 133 to control intake valves 109 and produce synchronous rotation. Similarly, a timing belt may be used to drive magnetos which supply spark to the sparkplugs. These magnetos may be adjustable so as to provide spark at the proper time in relation to the position of pistons 104.

Figure 12:
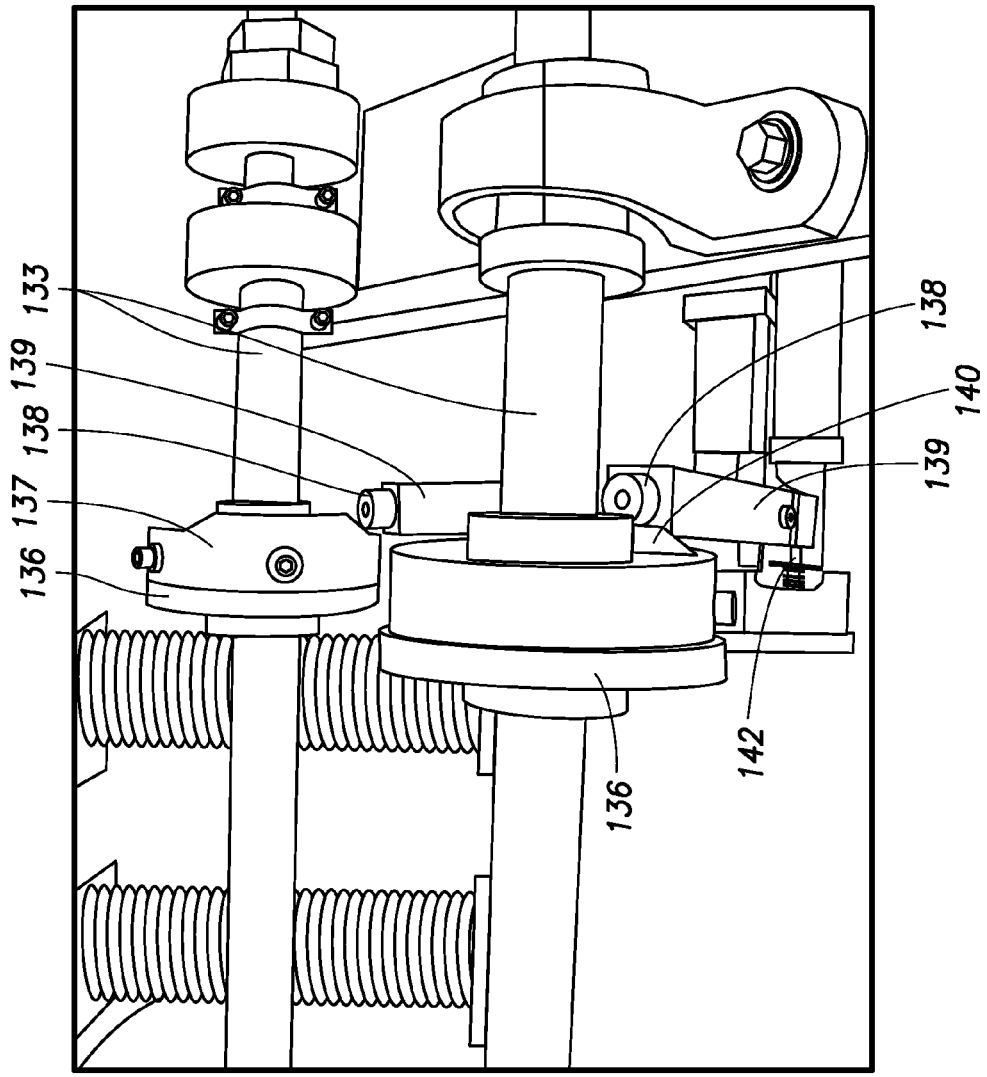
FIG. 12 is a close up top view from the flywheel side of the engine shown in FIG. 6.

FIG. 12 shows cam shafts 133. Two cam disks 136 may be rigidly secured to the cam shafts 133, as shown. An exhaust cam plate 137 may be secured to cam disk 136. As the cam shafts rotate, the lobe on cam plate 137 may engage a roller 138 on rocker arm 139, which may cause the rocker arm to move thereby activating the exhaust valve. Intake cam plate 140 is shown while the lobe engages roller 138 on rocker arm 139, which is momentarily holding intake valve 142 in the open position. These cam disks and cam plates are representative of all eight cam disks and cam plates on the engine.

Figure 13:
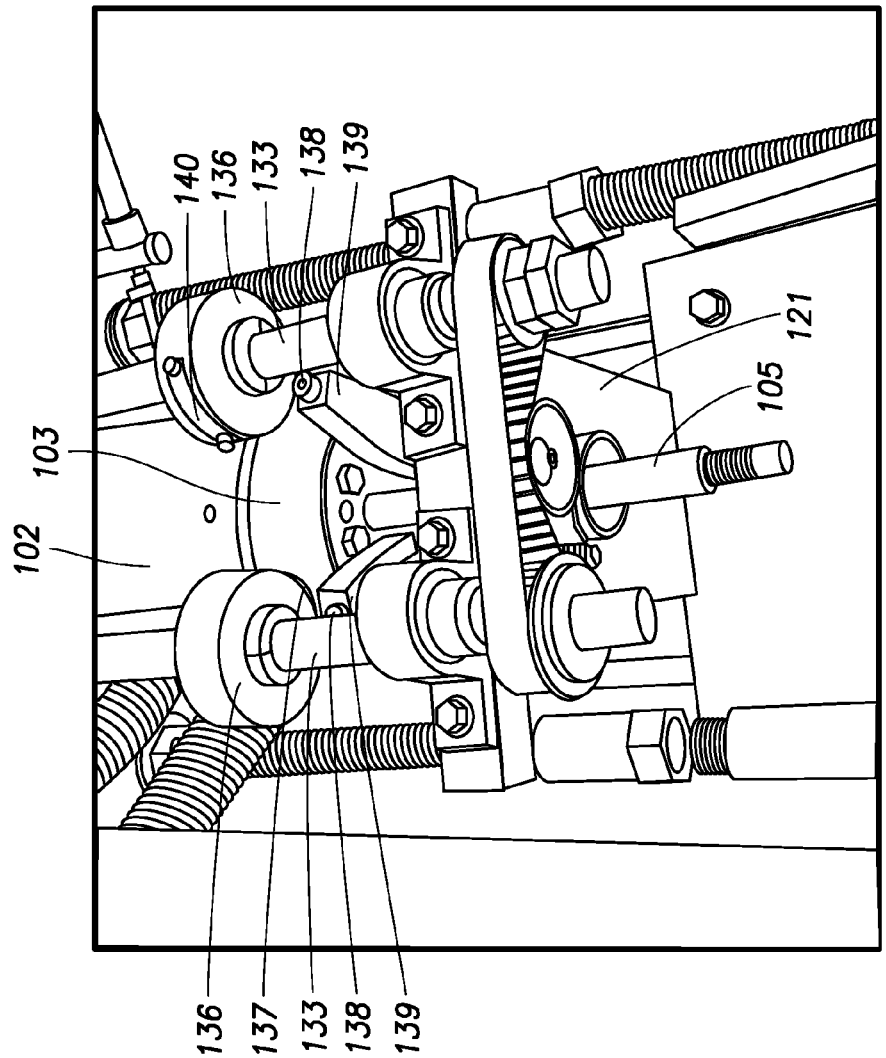
FIG. 13 is a close up top view of the output end of the engine shown in FIG. 6.

FIG. 13 is a top view of the output end of the engine. Piston rod 105 and a vertical outboard support plate 121 are shown. Cam shafts 133, cam disks 136, two cam plates 137 and 140, two rollers 138 and two rocker arms 139 are shown. Cylinder head 103 and cylinder 102 are also shown. A power takeoff device (not shown) may be coupled with the outboard end of piston rod 105. In an embodiment, the power takeoff device may convert the linear reciprocating motion of piston rod 105 into rotary motion. For example, the power takeoff device may comprise a double over running clutch gearbox. In another embodiment, the power takeoff device may convert the linear reciprocating motion of the piston rod 105 into hydraulic work energy. For example, the power takeoff device may comprise a reciprocating hydraulic pump. In yet another embodiment, the power takeoff device may convert the linear reciprocating motion of piston rod 105 into electrical energy. For example, the power takeoff device may comprise a linear generator. One having ordinary skill in the art will appreciate there are a variety of suitable power takeoff devices, and the present disclosure should not be limited to these specific illustrative embodiments.

Figure 14:
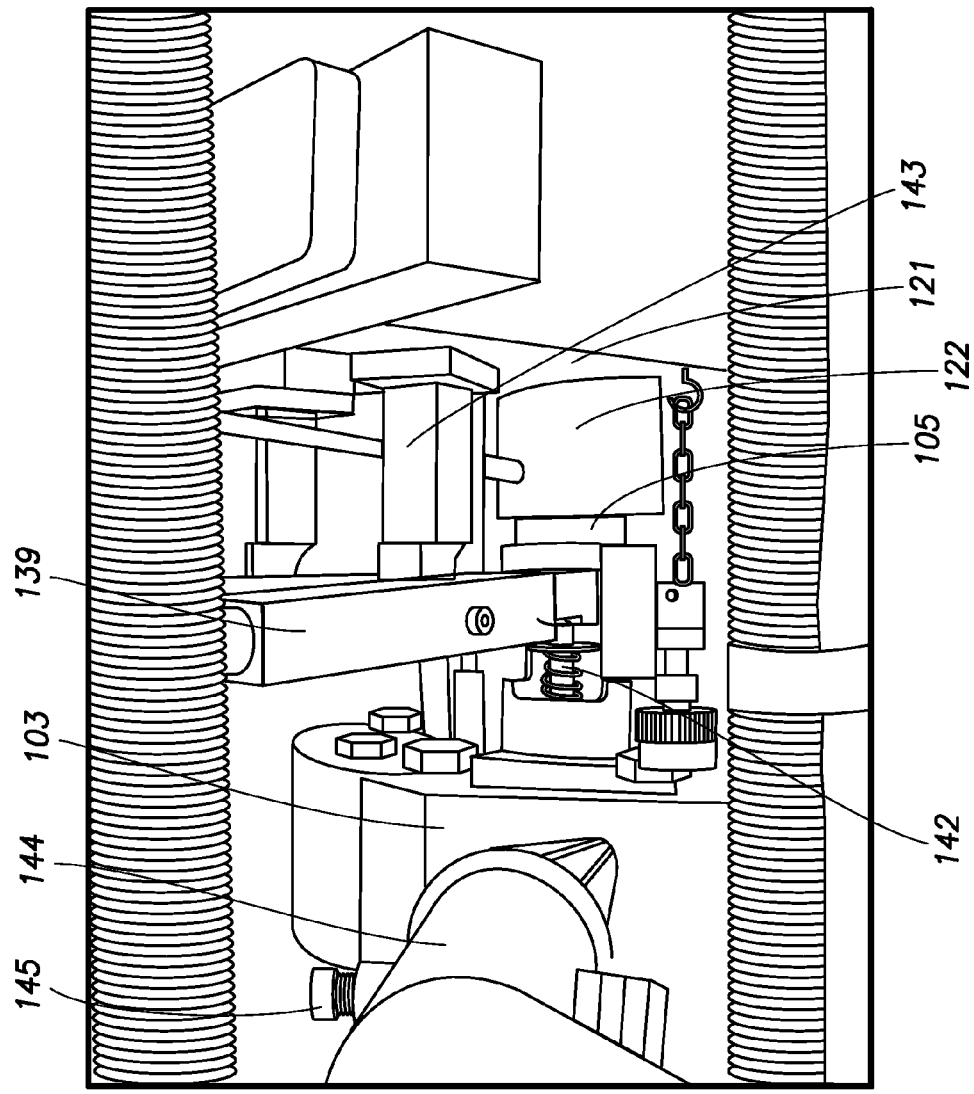
FIG. 14 is a close up view from the flywheel side of the engine shown in FIG. 6.

FIG. 14 shows rocker arm 139 as it engages intake valve 142. A first end of pivot support 143 may be rigidly secured to a vertical outboard support plate 121. A second end of pivot support 143 may be attached to rocker arm 139 in a manner that enables the rocker arm to pivot as the intake valve 142 is engaged. A bronze bushing 122, piston rod 105 and cylinder head 103 are also shown. An air intake tube 144 may be secured to cylinder head 103. In one embodiment, a separate fuel injector 145 may be secured to each air intake tube 144 (that is, one fuel injector 145 for each cylinder 102). In another embodiment, fuel injectors 145 may be located on cylinder heads 103, thereby providing direct injection into the combustion chambers.

Figure 15:
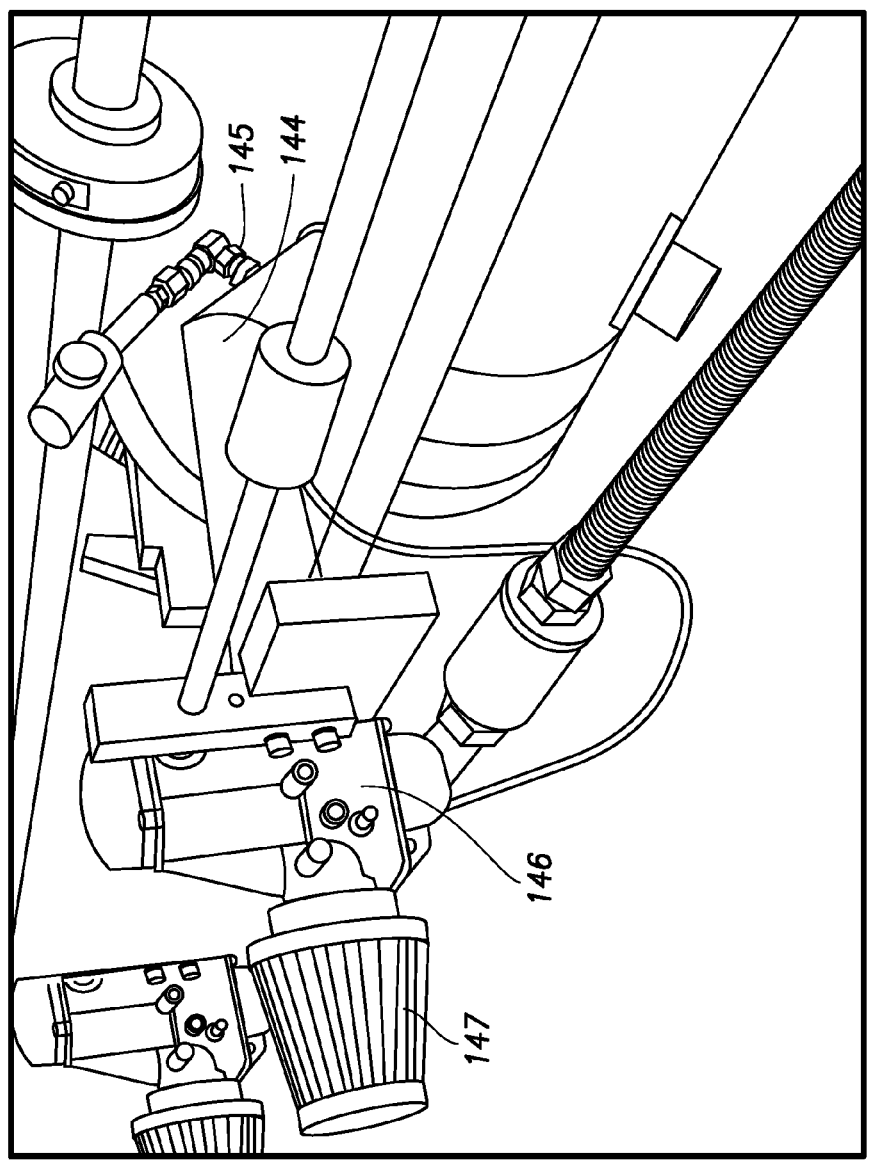
FIG. 15 is a close up view from the input end of the flywheel side of the engine shown in FIG. 6.

FIG. 15 shows an air intake tube 144 and the fuel injector 145. A throttle body 146 and air cleaner 147 are also shown. The same type of arrangement may be used on all four cylinders.

Figure 16:
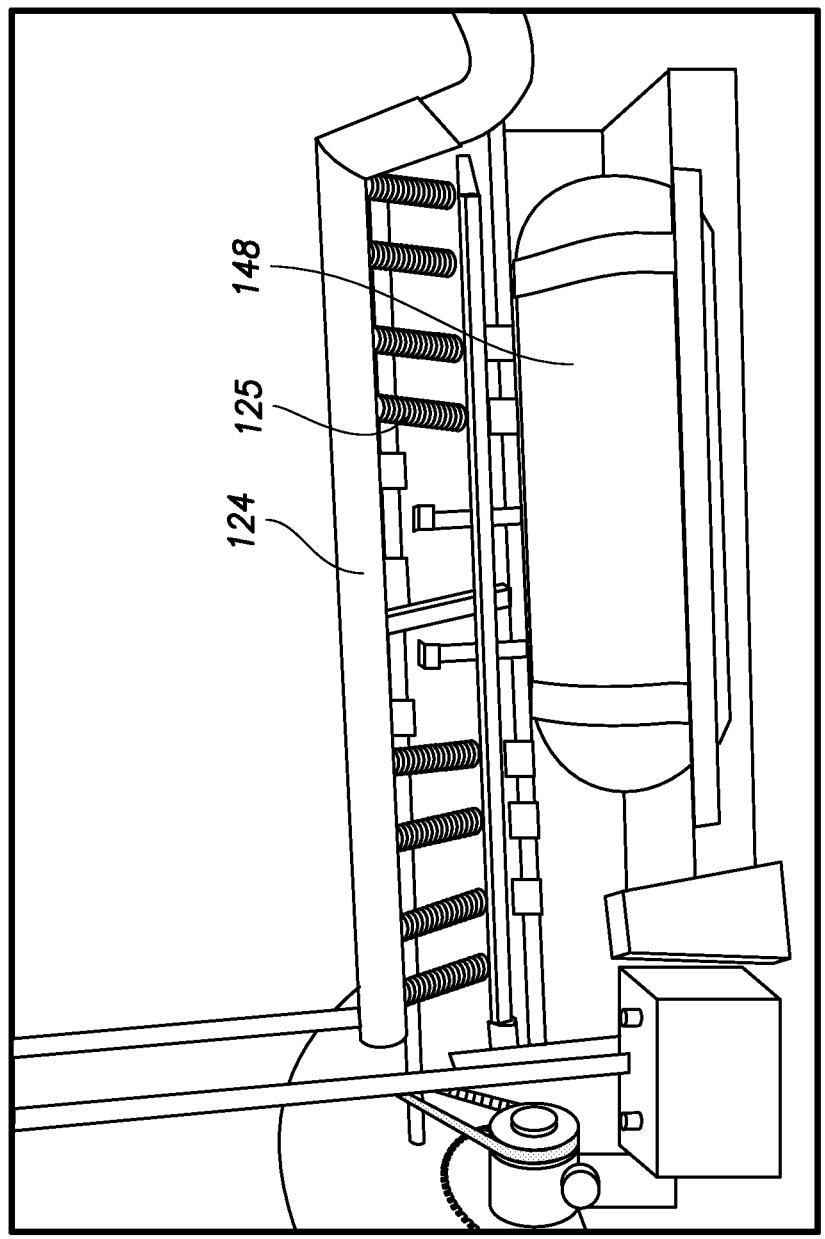
FIG. 16 is a perspective view of the exhaust side of the engine shown in FIG. 6.

FIG. 16 shows the exhaust side of the engine where the exhaust manifold 124 and eight exhaust tubes 125 are visible. A compressed natural gas fuel tank 148 may provide fuel to each separate fuel injector 145. A power off take system, which attaches to the output end of the piston rod, has not been installed as of this date.

Engine 100 may further comprise an engine control unit (ECU) 150 (not shown). In an embodiment, ECU 150 may be a small computer similar to that found in automotive engines. ECU 150 may communicate with a remote computer used to operate the engine. In an embodiment, ECU 150 may be used to control the flow of fuel to each cylinder 102. Referring back to FIG. 10, in this embodiment, ECU 150 may receive input data from a magnetic sensor 129 in communication with timing disk 128, thereby enabling ECU 150 to open and close fuel injectors 145 at the correct time and in the correct sequence. The amount of fuel being injected may be controlled by the remote computer, which can be preset to run engine 100 automatically, or to allow manual control so as to run engine 100 in a rich or lean manner if desired. ECU 150 may also collect temperature data provided by various sensors. In various embodiments, these sensors may be located in the walls of cylinders 102, exhaust tubes 125, exhaust manifold(s) 124, and/or water pipes feeding each water injector (one for each cylinder head).

With reference now to all the FIGURES, various operation alternatives for the engine will now be described. Some of these operations are anticipatory as the prototype engine has not yet been run at these conditions.

As the engine runs, the gasses produced by the combustion of the fuel may be well above 1,000 degrees F. As these hot gasses enter and pass through the exhaust manifold(s) 124, a relatively high temperature is developed inside the manifold (s) 124. According to one embodiment, a plurality of exhaust manifolds, 124 all heavily insulated and containing heat exchangers coupled in series, may be used to transfer heat from the exhaust gasses to water inside high pressure water lines. The temperature of the water may reach several hundred degrees F. When water is pressurized, it can be heated well above 212 degrees F. without turning into steam. When it is released or injected into an atmosphere of lower pressure such as the combustion chamber of the engine, it flashes into steam. To enhance the process of flashing the water into steam, the combustion chamber and cylinder 102 can be heated between 212 degrees F. and about 500 degrees F. as previously stated. Therefore, the lack of a cooling system and the use of insulation to retain heat are better understood. In an embodiment, the superheated water may be provided by a high pressure pump driven by the engine 100. This pump may produce pressures of 100 psi up to approximately 4000 psi. Piping, such as tubular coils of copper, stainless steel, or any other suitable material may be placed inside exhaust manifold (s) 124 and provide water flow from the pump to the water injectors on the cylinder heads 103. One having ordinary skill in the art will realize the shape and exposed surface area of this piping may be maximized to enable water to be gradually heated as it passes therethrough. Any clean, filtered fresh water source can be used to supply water to the system.

The process of flashing water into steam may be referred to herein as flash steam expansion. This process may comprise any manner of rapidly converting water into steam within a cylinder 102. In an embodiment, room temperature water may be flashed into steam if introduced into a cylinder 102 having a high enough temperature to rapidly convert the water into steam. In other embodiments, as previously described, the water may be heated or superheated prior to injection into a cylinder 102 to enhance the process. In still further embodiments, water (at any suitable temperature) may be pressurized to a high pressure prior to injection into a cylinder 102 at a lower pressure to enhance the process. One having ordinary skill in the art will recognize that flash steam expansion may be achieved and/or enhanced using a variety of methods, and the present disclosure should not be limited to those embodiments described herein for illustrative purposes.

In one embodiment, the exhaust from the furthermost manifold 124 from the engine 100 exits the manifold 124 at approximately room temperature. When the hot high pressure water in the manifold 124 closest to the engine 100 reaches the desired temperature, which could be the same as the engine temperature, it is ready to be injected into the combustion chamber of the engine 100. In an embodiment, this point is reached when engine temperature reaches approximately 300 to 500 degrees F., the temperature in the manifold nearest the engine reaches 1000 degrees F. or more, and the water temperature entering the water injectors reaches approximately 500 degrees F. or more. It can be beneficial to ensure the engine temperature is within a desirable range prior to injecting superheated water—this may be achieved by running the engine 100 for several minutes and monitoring engine temperature gauges. When the engine 100 starts from a cold start, it uses fuel such as natural gas, propane, hydrogen or bio-fuel and as it runs, it heats up. When the desired engine, manifold, and water temperatures are reached, the fuel may be automatically shut off and replaced by hot pressurized water injections.

When the injected water temperature and engine temperature are approximately equal, very little heat exchange is expected to occur in the engine 100 when the water flashes into steam. It is anticipated that this will enable the engine 100 to run for some time before the exhaust steam can no longer heat the injection water to the desired temperature in the manifolds 124. As the engine temperature and the temperature of the injection water cool down to the point where the flash steam is not providing sufficient engine power, or the water is not flashing into steam, the water injections can be stopped and the use of fuel may be resumed. This process of changing from fuel to water and back to fuel can occur automatically while the engine 100 is running, which results in continuous alternating cycles of internal combustion and flash steam. Some of the engine power may thereby be produced from fuel and some may be produced by steam. This results in less fuel being used and higher engine efficiency.

The injection water may be superheated to the super critical temperature of 705 degrees F. or more in an effort to produce more output power, but the engine temperature should not be allowed to overheat to avoid breaking down of the engine lubricant. This may be accomplished by discontinuing the use of fuel somewhat before the engine temperature reaches its highest allowable temperature. The superheated injection water will then impart some of its heat to the engine 100 as it flashes into steam, and this will continue until the temperature inside the exhaust manifolds 124 drops from the absence of combustion in the engine 100 and can no longer super heat the injection water.

The amount of water that is injected and flashed into steam can vary automatically based on the temperature of the water and the engine 100. To provide smooth uninterrupted power output of the engine 100, the amount of injected water could be sufficient to produce steam power, which is approximately equal to the power produced by the fuel combustion. Generally, as the amount of injected water is increased during the steam mode, the engine power should be increased. Computer control may be used to set the amount of water that is injected into each cylinder for each power stroke. The volume of water may vary from a fraction of one cubic inch to as much as 10 cubic inches or more per stroke. Likewise, the number and duration of injections may be controlled; for example, computer control or other input may provide for a single short injection, multiple short injections, or one continuous injection for the duration of the power stroke (or any suitable variation thereof).

According to another embodiment of the present disclosure flash steam may be used during the power stroke while fuel is being used. As the spark initiates combustion of the air/fuel mixture, the piston moves part way through its power stroke and then water is injected and flashed into steam to provide additional pressure and power to the piston 102. Each power stroke is therefore driven by a combination of exploding fuel and flash steam expansion.

In an embodiment, the fuel supply and ignition spark may be shut off so that the engine runs on flash steam only. A computer or operator may monitor temperatures and power output to determine when it is necessary or desirable to resume the use of fuel (with or without water injections).

In another embodiment, the engine is capable of operating in a customary four cycle mode using fuel only, fuel and steam together, or steam only and the change from fuel to steam and back to fuel can be governed automatically.

In another embodiment, the engine operates in a two-cycle mode using flash steam only. In two cycle steam mode, two cylinders produce power simultaneously as compared to one cylinder at a time in four cycle mode. Specifically, water will be injected into two cylinders simultaneously pushing a first and third piston in one direction, and a second and fourth piston in the opposite direction. This should result in approximately twice the amount of engine power, and further increases efficiency because no fuel is consumed.

The valve timing must be changed in order to operate the engine in two-cycle mode. In an embodiment, the intake valves are disabled via a clutch arrangement on the intake valve cam shaft, thereby rendering all intake valves closed. The four cycle exhaust valve cam shaft remains in use opening and closing exhaust valves once per cylinder in every four strokes of the engine. A second exhaust valve cam shaft is required to operate a second set of exhaust valves. This process works the same as the first exhaust valve cam shaft except the valves are timed to open and close 180 degrees out of phase with the first cam shaft. This results in two exhaust valves per cylinder opening and closing intermittently so that for each cylinder one of the exhaust valves opens once every two strokes of the pistons.

When a given piston is at Top Dead Center, all valves are closed, hot water is injected and flashes into steam, thereby driving the piston to Bottom Dead Center. At this point, the exhaust valve opens and the piston returns to Top Dead Center where the process repeats. In the two-cycle mode, the intake and compression strokes are not needed. A clutch arrangement governing the linear position of the cam shaft may be used to activate the second exhaust valve cam shaft in communication with deactivating the intake valve cam shaft.

In yet another embodiment, the engine has at least four cylinders and operates initially as a four-cycle engine. It may then change from four-cycle mode to two-cycle mode and then back to a four-cycle mode. These changes may occur automatically while the engine is running, or the modes can be triggered manually while the engine is running.

In yet another embodiment of the present disclosure, one or more separate and independent heat sources can be used to provide hot pressurized water for the water injection process. This provides the opportunity to operate with flash steam for longer periods of time without depending only on the heat produced by the engine. A solar or fuel powered water heater could be used for this purpose.

In another embodiment of the present disclosure where a suitable external independent heat source is consistently available, the engine can be provided with no internal combustion capability since fuel combustion is not needed to heat the engine or produce heat for heating the injection water and flashing the water into steam. Here, the engine may have at least one cylinder and may operate continuously in a two cycle steam mode. A good example of this embodiment would be to install the engine in an industrial setting where furnaces are used for the production of steel or the heat treating of steel. Such furnaces consistently have large amounts of attendant waste heat, which can be conserved with heat exchangers and used to heat the engine and the injection water.

Many embodiments of this disclosure are well suited for rotary output internal combustion engines where the linear movement and power of the pistons is transferred to a crank shaft to produce rotary output power. Many embodiments of this disclosure are also well suited for use in linear internal combustion engine applications, which produce reciprocating linear output power.

It will also be appreciated that one or more of the elements depicted in the figures can also be implemented in a more separated or integrated manner, or even removed or rendered as inoperable in certain cases, as is useful in accordance with a particular application.

As used in the description herein and throughout the claims that follow, "a," "an" and "the" include plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present disclosure, including what is described in the Abstract, is not intended to be exhaustive or to limit the present disclosure to the precise forms disclosed herein. While specific embodiments of, and examples for, the present disclosure are described herein for illustrative purposes only, various equivalent modifications are possible within the spirit and scope of the present disclosure, as those skilled in the relevant art will recognize and appreciate. As indicated, these modifications may be made to the present disclosure in light of the foregoing description of illustrated embodiments of the present disclosure and are to be included within the spirit and scope of the present disclosure.

Thus, while the present disclosure has been described herein with reference to particular embodiments thereof, a latitude of modification, various changes and substitutions are intended in the foregoing disclosures, and it will be appreciated that in some instances some features of embodiments of the present disclosure will be employed without a corresponding use of other features without departing from the scope and spirit of the present disclosure as set forth. Therefore, many modifications may be made to adapt a particular situation or material to the essential scope and spirit of the present disclosure. It is intended that the present disclosure not be limited to the particular terms used in the following claims and/or to the particular embodiment disclosed as the best mode contemplated for carrying out the present disclosure, but that the present disclosure will include any and all embodiments and equivalents falling within the scope of the appended claims. Thus, the scope of the present disclosure is to be determined solely by the appended claims.

What is claimed is:

1. An engine operable in an internal combustion mode and a flash steam expansion mode, the engine comprising:
    one or more cylinders, each cylinder comprising:
        a piston;
        an air intake port having an intake valve; and
        first and second exhaust ports having first and second exhaust valves, respectively;
    a first cam shaft to operate the first exhaust valve on each cylinder;
    a second cam shaft to operate the second exhaust valve on each cylinder; and
    a third cam shaft to operate the intake valve on each cylinder;
    wherein the engine is selectably operable in a four-cycle mode or a two-cycle mode; and wherein in the two-cycle mode, for a given cylinder, the intake valve is configured to close by disabling the third cam shaft, the first cam shaft is configured to open and close the first exhaust valve once every four strokes of the engine, and the second cam shaft is configured to open and close the second exhaust valve once every four strokes of the engine, the opening and closing of the second exhaust valve configured to occur 180 degrees out of phase with the opening and closing of the first exhaust valve.

2. The engine of claim 1 wherein the one or more cylinders are arranged in a linear configuration, and further comprising a single piston rod extending through and beyond each cylinder and to which each piston is rigidly coupled.

3. The engine of claim 1 wherein the engine is operable using internal combustion or a combination of internal combustion and flash steam expansion in the four-cycle mode.

4. The engine of claim 1 wherein the engine is operable using flash steam expansion in the two-cycle mode.

5. The engine of claim 1 wherein in the four-cycle mode, for a given cylinder, the second exhaust valve is configured to close by disabling the second cam shaft, the third cam shaft is configured to open and close the intake valve once every four strokes of the engine, and the first cam shaft is configured to open and close the first exhaust valve once every four strokes of the engine, the opening and closing of the first exhaust valve occurring 270 degrees out of phase with the opening and closing of the intake valve.

6. The engine of claim 1 wherein one or more of the cylinders comprises a fuel ignition mechanism.

7. The engine of claim 1 wherein the engine is configured to ignite a mixture of fuel and air within the one or more cylinders and, subsequently within the same power stroke, inject water through the water injection ports into the one or more cylinders.

8. The engine of claim 7 wherein the injected water is heated to a superheated state prior to injection.

9. The engine of claim 1 further comprising:
    a single piston rod extending through and beyond each cylinder and to which each piston is rigidly coupled; and
    a crankshaft coupled to a first end of the piston rod.

10. The engine of claim 9 wherein the crankshaft is rotatably driven by a motor.

11. The engine of claim 9 further comprising:
    a single piston rod extending through and beyond each cylinder and to which each piston is rigidly coupled; and
    a momentum device coupled with the piston rod.

12. The engine of claim 9 further comprising:
    a single piston rod extending through and beyond each cylinder and to which each piston is rigidly coupled; and
    a power takeoff device coupled with a second end of the piston rod.

13. The engine of claim 12, wherein the power takeoff device comprises at least one of a double over running clutch gearbox.

14. The engine of claim 12, wherein the power takeoff device comprises a linear generator.

15. The engine of claim 12, wherein the power takeoff device comprises a reciprocating hydraulic pump.

16. The engine of claim 1, further comprising:
    one or more exhaust manifolds coupled with at least one of the first exhaust port or the second exhaust port; and
    a water source in fluid connection with one or more of water injection ports and in thermal connection with one or more of the exhaust manifolds to transfer heat from one or more exhaust manifolds to the water source.

17. The engine of claim 1 further comprising an independent heat source configured to heat water prior to injection into the one or more cylinders.

18. A method of operating an engine operable in a four-cycle internal combustion mode and a two-cycle flash steam expansion mode, the method comprising:
    using internal combustion to drive one or more pistons in a given cylinder in a four-cycle sequence, wherein using internal combustion to drive one or more pistons in a given cylinder in a four-cycle sequence comprises:
        opening and closing an intake port of the given cylinder at a first interval; and
        opening and closing an exhaust port of the given cylinder at a second interval, wherein the second interval is 270 degrees out of phase with the first interval;
    detecting when a temperature of the engine reaches a predetermined temperature; and terminating internal combustion and using flash steam expansion to drive the one or more pistons in a given cylinder in a two-cycle sequence, when the detected temperature of the engine reaches the predetermined temperature.

19. The method of claim 18, wherein terminating internal combustion and using flash steam expansion to drive the one or more pistons in a two-cycle sequence comprises:
ceasing the intake of air into the given cylinder;
opening and closing a first set of exhaust ports of the given cylinder at a third interval; and
opening and closing a second set of exhaust ports of the given cylinder at a fourth interval, wherein the third interval is 180 degrees out of phase with the fourth interval.

20. The method of claim 18, further comprising using a combination of internal combustion and flash steam expansion to drive the one or more pistons in a given cylinder in the four-cycle sequence when the detected temperature of the engine reaches the predetermined temperature.

21. The method of claim 20, wherein using a combination of internal combustion and flash steam to drive the one or more pistons in a given cylinder in the four-cycle sequence comprises:
supplying a fuel-air mixture into a given cylinder during an intake stroke of the four-cycle sequence, wherein the fuel-air mixture comprises a suitable stoichiometric ratio of fuel and air;
igniting the fuel-air mixture during a power stroke of the four-cycle sequence, the resulting combustion partially driving the piston away through the power stroke; and
when the piston is partially through the power stroke, supplying water into the given cylinder.

22. A method of operating an engine operable in a four-cycle internal combustion mode and a two-cycle flash steam expansion mode, the method comprising the steps of:
using internal combustion to drive one or more pistons in a given cylinder in a four-cycle sequence;
detecting when a temperature of the engine reaches a predetermined temperature; and
terminating internal combustion and using flash steam expansion to drive the one or more pistons in a given cylinder in a two-cycle sequence when the detected temperature of the engine reaches the predetermined temperature; and
using a combination of internal combustion and flash steam expansion to drive the one or more pistons in a given cylinder in the four-cycle sequence when the detected temperature of the engine reaches the predetermined temperature.

23. The method of claim 22, wherein using internal combustion to drive one or more pistons in a four-cycle sequence comprises:
opening and closing an intake port of the given cylinder at a first interval; and
opening and closing an exhaust port of the given cylinder at a second interval;
wherein the second interval is 270 degrees out of phase with the first interval.

24. The method of claim 22, wherein terminating internal combustion and using flash steam expansion to drive the one or more pistons in a two-cycle sequence comprises:
ceasing the intake of air into the given cylinder;
opening and closing a first set of exhaust ports of the given cylinder at a first interval; and
opening and closing a second set of exhaust ports of the given cylinder at a second interval, wherein the second interval is 180 degrees out of phase with the first interval.

25. The method of claim 22, wherein using a combination of internal combustion and flash steam to drive the one or more pistons in a given cylinder in the four-cycle sequence comprises:
supplying a fuel-air mixture into a given cylinder during an intake stroke of the four-cycle sequence, wherein the fuel-air mixture comprises a suitable stoichiometric ratio of fuel and air;
igniting the fuel-air mixture during a power stroke of the four-cycle sequence, the resulting combustion partially driving the piston away through the power stroke; and
when the piston is partially through the power stroke, supplying water into the given cylinder.

\* \* \* \* \*